UNITED STATES PATENT OFFICE.

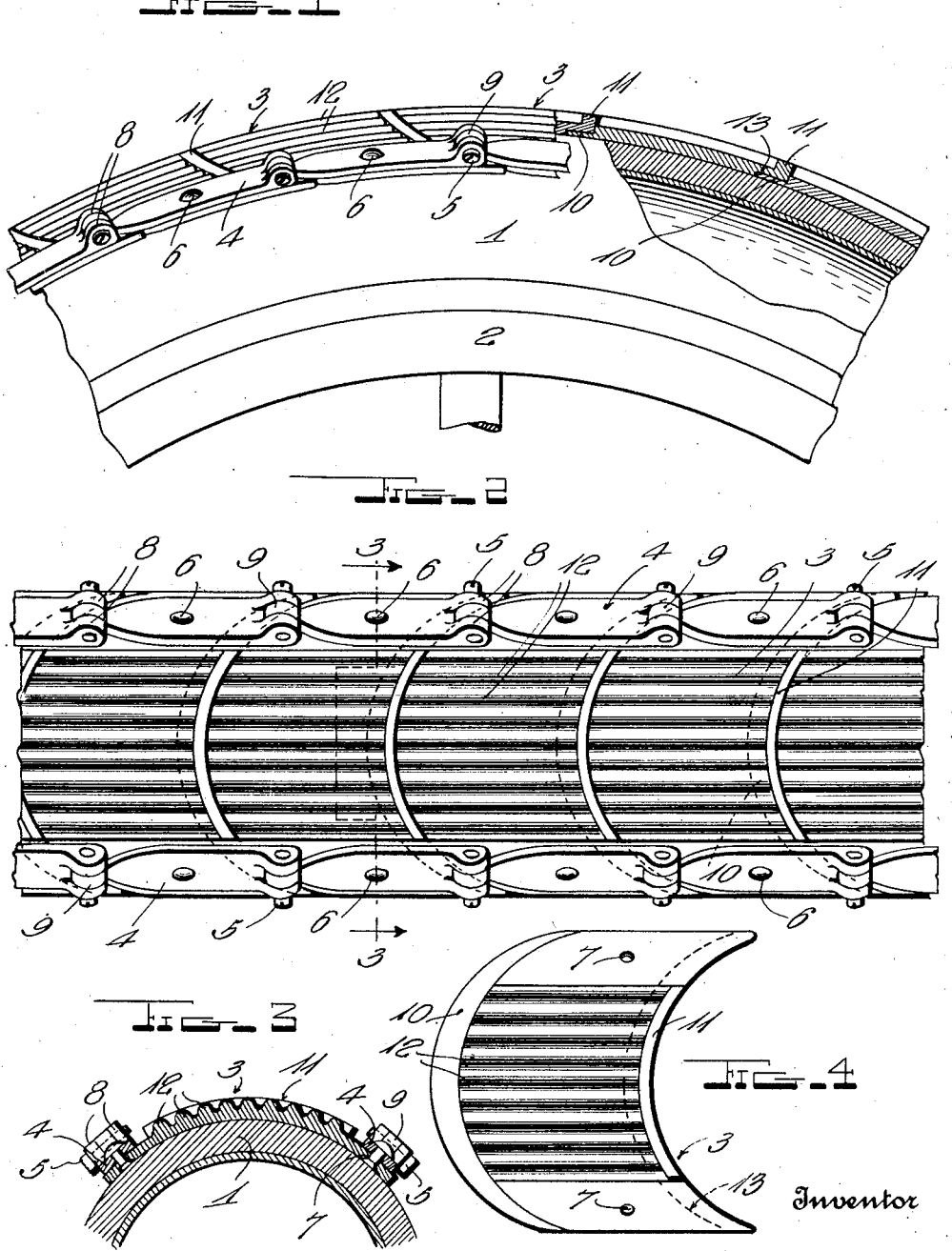

THOMAS J. McMANUS, OF MILWAUKEE, WISCONSIN.

TIRE-ARMOR.

1,330,129. Specification of Letters Patent. Patented Feb. 10, 1920.

Application filed August 25, 1919. Serial No. 319,630.

*To all whom it may concern:*

Be it known that I, THOMAS J. MCMANUS, a citizen of the United States, residing at Milwaukee, in the county of Milwaukee and State of Wisconsin, have invented certain new and useful Improvements in Tire-Armors; and I do declare the following to be a full, clear, and exact description of the invention, such as will enable others skilled in the art to which it appertains to make and use the same.

This invention relates to tire armors.

One object of the invention is to generally improve upon devices of this character by providing a structure which is exceedingly effective as an anti-skidding and tire-protecting device, which may be manufactured at a low cost, and will not easily break or quickly wear out.

Other objects and advantages may become apparent to persons who read the following details of description in connection with the accompanying drawing, in which:—

Figure 1 is a view partly in side elevation, and partly in vertical section, illustrating a portion of a tire and a portion of my improved armor applied to the tire.

Fig. 2 is a top plan or radial view of the structure disclosed in Fig. 1.

Fig. 3 is a sectional view along the line 3—3 of Fig. 2.

Fig. 4 is a plan or radial view of one of the substantially crescent shaped tread-plates.

Referring to these drawings in detail, in which similar reference characters correspond with similar parts throughout the several views, and in which the tire 1 and rim 2 are shown merely to illustrate the relation of the armor thereto—

The invention comprises an annular series of tread plates 3, two annular series of links 4, screws or pivot elements 5 which connect the links together, and rivets 6 which connect the links to the tread-plates.

Each plate 3 is formed with apertures 7, and the links 4 are provided with similar apertures at their middle portions, and the rivets 6 extend through the apertures of the links 4 and plates 3. It will be seen, therefore, that the links 4 are substantially pivotally connected to the plates 3, respectively, and that by allowing a slight clearance between the furcations 8 and the inserted ends 9 of the links 4, the armor is permitted to have a limited lateral deflection or band so that the lateral resiliency of the tire is not interfered with when side pressure is encountered. Each plate 3 is also formed with a circumferential extension 10 which is arcuate or substantially crescent shaped in radial contour, and the opposite end of each plate 3 is formed with a rib 11 which projects outward sufficiently to form a tractor-lug which engages with the track on which the wheel travels and prevents circumferential slipping of the wheel. In order to prevent slipping of the wheel laterally of its circumferene, each plate 3 is formed with a series of corrugations 12 which terminate in the rib 11. The rib 11 also strengthens and stiffens the plate 3 where it would otherwise be weakened by the provision of a groove or recess 13 which receives the tongue 10 of one of the adjacent plates 3. It will be seen, therefore, that the plates 3 are overlapped with one another so that there is no joint through which any sharp pointed thing can enter to puncture the tire.

The plates 3 are preferably formed of springy metal and one purpose of forming them in the crescent shape, as illustrated in Fig. 4, is to make their length, (laterally of the series) as great as practical, so as to maximize their resiliency. Another purpose of forming plates in this shape is to make the rib 11 of the maximum rigidity without increasing its circumferential thickness. The curvature of the rib 11 also aids in preventing the wheel from slipping laterally.

Although I have described this embodiment of my invention very specifically, it is not intended to limit my invention to these exact details of construction and arrangement of parts but changes may be made within the scope of the inventive idea as implied and claimed.

What I claim as my invention is:

1. A tire armor comprising an annular series of tread-plates each of which is substantially crescent shaped in radial contour, and a pair of links for each of said tread-plates, each link of each pair having its middle portion secured to one of said crescent-shaped tread-plates and having its ends pivotally connected to two other links of said pairs.

2. A tire armor comprising an annular series of tread-plates each of which is formed with corrugations extending circumferentially and with a rib in which one end of each corrugation terminates, said rib being arcuate in radial contour and projecting radially outward to form a traction lug, each plate having a relatively thin circumferential extension beyond the corrugations, each plate being formed with a recess under said rib to receive the circumferential extension of one of the adjacent plates, each plate being apertured at opposite sides of said corrugations, links having their ends connected together, and a rivet for each link, said rivet extending through the middle portion of its link and through one of the apertures of the contiguous tread-plate.

In testimony whereof I have hereunto set my hand.

THOMAS J. McMANUS.